Patented Aug. 3, 1926.

1,594,547

UNITED STATES PATENT OFFICE.

RALPH A. NELSON, OF BUFFALO, NEW YORK, ASSIGNOR TO NATIONAL ANILINE & CHEMICAL CO., INC., OF NEW YORK, N. Y., A CORPORATION OF NEW YORK.

PRODUCTION OF ALPHA-NITRONAPHTHALENE-BETA-SULPHONIC ACIDS.

No Drawing. Application filed May 3, 1920. Serial No. 378,405.

This invention relates to the production of alpha-nitronaphthalene-beta sulphonic acids from naphthalene. These acids, or the reaction mixture containing them, may be reduced to form the so-called Cleve's acids. These acids consist mainly of a mixture of the 1.6- and 1.7-naphthylamine-sulphonic acids. Some small amount of the 1.3-naphthylamine-sulphonic acid may also be present, but the amount is relatively small.

According to the present invention, naphthalene is subjected to sulphonation at an elevated temperature and the product of sulphonation, containing the naphthalene-beta-sulphonic acids, is subjected to nitration without isolation from the excess sulphuric acid, so that the same excess sulphuric acid assists in both the sulphonation and nitration operations. The alpha-nitro derivatives thus produced may then be subjected to reduction to convert the nitro derivatives into amido derivatives. The amido derivatives thus produced can be isolated, either in the form of the free acids, or in the form of salts thereof.

The sulphonation of the naphthalene, for the production of the naphthalene-beta-mono-sulphonic acids, is carried out at an elevated temperature, by melting the naphthalene, heating it to a temperature of around 140 to 166° C., and adding the sulphuric acid thereto, so that the sulphonation takes place rapidly and at an elevated temperature and with the direct production of the beta-sulphonic acids. During the addition of the sulphuric acid, the mixture is agitated at such a rate as to prevent the formation of two separate layers. The sulphonation can be effected with 66° Bé. (i. e., about 93.2%) sulphuric acid, but is more advantageously effected by the use of 100% sulphuric acid.

The sulphonation product will contain the large excess of concentrated sulphuric acid required to complete the sulphonation. The sulphonic acids are not separated from this excess sulphuric acid, but the sulphonation product, still containing the excess sulphuric acid, is utilized directly for the nitration, by the addition thereto of the nitrating agent together with such further amounts of sulphuric acid as may be necessary. The excess sulphuric acid from the sulphonation is thus made available in the nitration, effecting an important economy in the amount of sulphuric acid required to be separately added for the nitration, while the use of the hot sulphonation product is further advantageous in economizing in the amount of heat required for heating the nitrating mixture to the nitrating temperature. The nitration is effected at a suitable temperature of about 45 to 60°, with gradual addition of the nitrating agent. After completion of the nitration, the product is neutralized with lime, the precipitated gypsum or calcium sulphate filtered while still hot. If it is desired to produce Cleve's acid from the alpha-nitronaphthalene-beta-sulphonic acid of the present invention, the filtrate while still hot, is subjected to reduction, preferably by means of acetic acid and powdered iron, with such further heating as may be necessary. The reduction product may be separated from the accompanying iron oxide or iron compound and may be suitably treated for the isolation of alpha-naphthylamine-beta-sulphonic acid, either as such, or in the form of their sodium or other salts.

The invention will be further illustrated in connection with the production of Cleve's acid by the following specific example, the parts being by weight:

*Sulphonation.*—325 parts of naphthalene are introduced into a sulphonation kettle equipped with an agitator, preferably of the propeller type closely fitting the bottom of the kettle and rotated at a sufficiently rapid rate to prevent the formation of two layers during the sulphonation. The naphthalene is heated and melted and agitated until the temperature rises to about 166°. The sulphuric acid, of 66° Bé., is then added, while continuing the agitation, until about 520 pounds of acid have been added over a period of about 15 minutes. The heating is continued during the addition of the acid to prevent any appreciable drop in temperature, heating is then discontinued, and the agitation continued for a further period of about 10 minutes, the temperature being maintained around 165° C. At the completion of the sulphonation, the sulphonation product, while still in a heated state, is transferred to the nitrating kettle, which may be effected by blowing the sulphonation product, by means of air pressure, through preheated pipes. The sulphonation product is then agitated while it slowly cools to a temperature of about 85 to 90° C., which is somewhat above the solidifying temperature.

The sulphonation product is not treated for the separation of the naphthalene-sulphonic acids from the excess sulphuric acid, but this excess sulphuric acid is left in the mixture and a further addition is made of about 470 pounds of sulphuric acid of 66° Bé. which may conveniently be run into the sulphonating kettle and then transferred to the nitrating kettle when the sulphonation product has cooled to the temperature above indicated, i. e., about 85 to 90°. The whole mixture is then preferably cooled with continued agitation to about 55° prior to the nitration.

*Nitration.*—To the sulphonation product with added sulphuric acid, produced as above described, there is added gradually about 300 pounds of 56% nitric acid and the nitration is carried out at a temperature between 45 and 60°, with active cooling. The rate of addition of the acid depends upon the cooling effect available, but may require from 4 to 6 hours or longer. The temperature is preferably kept as close as possible to 55° C. and for best results should not rise above 60° C. After the addition of the nitric acid is completed, agitation is continued for a further period of about 30 to 45 minutes to allow completion of the nitration, with further heating if necessary to maintain the temperature. When the nitration is completed, the product is transferred to the neutralizing vat where the excess acid is neutralized with lime.

*Neutralization.*—The nitration product is introduced into about 9500 pounds of wash water from previous neutralization operations. The mixture is heated to about 60° C. by the injection of steam and slaked lime is then added equivalent to about 600 pounds of unslaked lime, while agitating the mixture, until it is neutral or slightly alkaline in reaction. It is then filtered while still hot to remove the gypsum, for example, by forcing it through a filter press. The filtrate is collected for the subsequent reduction together with the first washings. The wash water resulting from subsequent washing of the gypsum is returned to the neutralization vat for use in subsequent reductions.

*Reduction.*—The filtrate containing the nitro-sulphonic acids, is heated to about 95 to 100° C. before reduction is started. About 15 to 20 pounds of 80% acetic acid is then added and about 300 pounds of powdered iron and the temperature is maintained at about 95 to 100° C. during the reduction. The progress is followed by spot testing on filter paper. When the reaction is complete, the wet ring at the outside of the spot is nearly colorless when the spot is made, and, as the spot dries, the outside ring turns to a purplish gray. After the reduction is continued for some time, it is necessary to add more acetic acid and iron so that the total amount of acid is about 25 pounds and of iron about 400 to 450 pounds. The complete reduction may take as much as 6 to 8 hours or more for its completion. When finished the iron oxide is allowed to settle, the liquor is drawn off, the iron oxide again agitated with a little water and again allowed to settle and the wash water drawn off and admixed with the reduction liquors which are then filtered through a suitable filter press. The washing can be repeated with hot water until the solution is quite clear and red in color. The reduction liquors are concentrated to about 7–8° Bé. while hot and are again subjected to filtration and the sludge washed.

The hot liquors from the filter press are immediately acidified with 20° Bé. hydrochloric acid until a strong acid reaction on Congo red paper is obtained, about 300 pounds of acid being required. Agitation is continued for about 6 to 8 hours to prevent the formation of a crust of heavy crystals on the bottom of the apparatus and the liquor is permitted to stand for a further period of time which may amount to as much as 2 days, after which the Cleve's acid is filtered through a suitable filter press and washed to remove the mother liquor. The product is somewhat soluble in water so that continuous washing is objectionable, but the washing can be effected by displacing the mother liquor with fresh water and allowing the fresh water to stand for a short time before forcing it out of the press, and repeating the washing in this way until the mother liquor is removed. The product obtained in the filter is then further dried and gives the Cleve's acid in a dried and isolated state.

The process can be carried out in a somewhat more advantageous manner by using 100% sulphuric acid instead of 66° Bé. acid (about 94%). By making use of 100% sulphuric acid it is possible to use considerably less total sulphuric acid in both the sulphonation and the nitration, with resulting economy in both operations. So also, less lime is required to neutralize the nitration liquors and less gypsum is formed so that the filtering capacity required is reduced or, with a given filtering capacity, increased production per working unit is permitted. The practice of the invention making use of 100% sulphuric acid will be further illustrated by the following specific example which also illustrates the production of Cleve's acid from the nitronaphthalene-sulphonic acid prepared by the present invention:

*Sulphonation.*—500 pounds of naphthalene are melted in the sulphonating kettle and heated to a temperature of about 155° C. Sulphuric acid of 100% strength is then added at a uniform rate so that about 610 pounds of acid is added during 15 minutes, the temperature gradually rising to about 160 to 164° C. After the acid is all added, agitation is continued for a further period of about 5 to 10 minutes and the sulphonation product is then transferred to the nitration kettle.

*Nitration.*—The sulphonation liquors are cooled, with continued agitation, and when near their solidification point (70 to 80° C.) there is added gradually about 310 pounds of 100% sulphuric acid, which acid is added just fast enough to keep the sulphonation product fluid as it is being agitated and cooled to about 45 to 50° C. The nitration is then effected by the gradual addition of about 330 pounds of 67½% nitric acid (42° Bé.), and with energetic cooling, while maintaining the temperature at 45 to 60° C. until the addition of the nitric acid is completed, which may require as much as 6 to 10 hours or more, depending upon the rate of cooling. The agitation is continued for a further period of about half an hour at the same temperature and the nitration product is then transferred to the neutralization vat where it is diluted with about 10,000 pounds of water, the mixture heated, and sufficient lime added for neutralization. The neutralized liquor is filtered hot, the gypsum washed with hot water, and the filtrate and first washings used for subsequent reduction, while subsequent washings are returned to the neutralization tank for admixture with the next nitration product.

*Reduction.*—The reduction of the neutralized liquor is carried out at around 90 to 100° in such a way that the liquors are concentrated during the reduction. About 30 pounds of acetic acid of 80% strength and 500 pounds of iron are added, and the reduction continued for a sufficient period of time, with agitation and generally heating, a further addition of 5 pounds of acetic acid and 50 pounds of iron being added to insure completion of the reduction. The progress of the reaction is followed by the spot test on paper. The complete reduction may require as much as 10 to 12 hours. After completion, the reduction product is allowed to settle, the liquor drawn off, the sludge washed by agitating with water and again allowed to settle and drawing off the wash water. The liquors drawn off are filtered hot and the filtrate and first washings concentrated to about 7-8° Bé. and again filter hot. The hot filtrate from the press, at a temperature of about 55 to 70° C., is treated with hydrochloric acid until it becomes definitely acid to Congo red paper, about 400 pounds of 20° Bé. acid being required. Care should be taken that the acid test due to the Cleve's acids themselves is not mistaken for the acidity due to hydrochloric acid which turns the Congo red paper a deep blue. After the acidification, the batch is allowed to stand for a period of 2 to 3 days with agitation in order to effect separation of the Cleve's acids, which are then separated by filtering and intermittent washing of the filtrate with cold water in the manner above described.

In case it is desired to separate the Cleve's acids in the form of their sodium salts, this can be advantageously effected by diluting the reduction liquors, making them definitely alkaline with soda at a temperature of about 95° C., filtering off the precipitate, concentrating the mother liquor and separating the sodium salts by the addition of sufficient common salt.

From the foregoing description it will be seen that the improved process of the present invention involves the sulphonation of naphthalene at an elevated temperature and in such a way as to produce a high yield of the beta-sulphonic acids, and the subsequent nitration of the sulphonic acids without isolation thereof from the sulphonation product, so that the excess sulphuric acid used in the sulphonation is present in and contributes to the subsequent nitration. The process can be practiced in a more advantageous manner by using 100% sulphuric acid instead of 66° Bé. acid, although the yield is not materially affected.

I claim:

1. The method of producing alpha-nitro-naphthalene-beta-sulphonic acids, which comprises subjecting naphthalene to sulphonation by the action of sulphuric acid upon molten naphthalene, the reaction taking place at a temperature around 140°–166° C., adding further amounts of sulphuric acid to the sulphonation product still containing the excess sulphuric acid from the sulphonation, and subjecting the resulting mixture to nitration by treatment with a nitrating agent.

2. The method of producing alpha-nitro-naphthalene-beta-sulphonic acids, which comprises subjecting naphthalene to sulphonation by the addition of sulphuric acid of 100% strength to molten naphthalene, the reaction taking place at a temperature around 140° to 166° C., and subjecting the sulphonation product, while still admixed with the excess sulphuric acid from the sulphonation, to nitration by treatment with a nitrating agent.

3. The method of producing alpha-nitro-naphthalene-beta-sulphonic acids, which comprises subjecting naphthalene to sulphonation by the action of sulphuric acid of 100% strength upon molten naphthalene, the reaction taking place at a temperature around 140° to 166° C., adding further amounts of sulphuric acid of 100% strength to the sulphonation product still containing the excess sulphuric acid from the sulphonation, and subjecting the resulting mixture to nitration by treatment with a nitrating agent.

4. The method of producing alpha-nitro-naphthalene-beta-sulphonic acids, which comprises subjecting naphthalene to sulphonation by the action of sulphuric acid of 100% strength upon molten naphthalene, the reaction taking place at a temperature around 140° to 166° C., adding further amounts of sulphuric acid to the sulphonation product still containing the excess sulphuric acid from the sulphonation, and subjecting the resulting mixture to nitration by treatment with a nitrating agent.

5. The method of producing alpha-nitro-naphthalene-beta-sulphonic acids, which comprises nitrating with the addition of further amounts of sulphuric acid, the sulphonation product obtained by subjecting molten naphthalene to the action of sulphuric acid, the reaction being carried out at a temperature around 140–166° C., and from which product the excess of sulphuric acid from the sulphonation has not been removed.

6. The method of producing alpha-nitro-naphthalene-beta-sulphonic acids, which comprises subjecting naphthalene to the action of an excess of sulphuric acid to effect sulphonation, the reaction taking place at a temperature of about 140° to 166° C., subsequently effecting nitration by the addition of a nitrating agent to the mixture of the sulphonation product and the excess sulphuric acid to which a further amount of sulphuric acid has been added, and carrying out the nitration at a temperature of about 45° to 60° C.

7. A method for producing alpha-nitro-naphthalene-beta-sulphonic acids, which comprises subjecting naphthalene to the action of an excess of sulphuric acid to effect sulphonation, the reaction taking place at a temperature of about 140° to 166° C., subsequently effecting nitration by the addition of a nitrating agent to the mixture of the sulphonation product and the excess sulphuric acid to which a further amount of sulphuric acid has been added, and carrying out the nitration at the temperature of approximately 55° to 60° C.

8. The method of producing alpha-nitro-naphthalene-beta-sulphonic acids, which comprises subjecting one part of naphthalene to the action of about 1.2 parts of sulphuric acid of 100% strength for a period of about 20 to 25 minutes, the reaction taking place at a temperature of about 140° to 166° C., cooling the mixture to about 70° to 80° C. and gradually adding about 0.6 parts sulphuric acid of 100% strength as the mixture further cools to about 45°–50° C., and subsequently subjecting the resulting mixture to nitration by adding thereto about 0.65 parts of nitric acid having a strength of about 67.5%, the temperature of the mixture during nitration being maintained at about 45°–60° C.

9. The method of producing alpha-nitro-naphthalene-beta-sulphonic acids, which comprises subjecting naphthalene to sulphonation by the addition of sulphuric acid of about 93.2 to 100% strength to molten naphthalene, the reaction taking place at a temperature around 140° to 166° C., and subjecting the sulphonation product, while still admixed with the excess sulphuric acid from the sulphonation, to nitration by treatment with a nitrating agent.

In testimony whereof I affix my signature.

RALPH A. NELSON.